(12) United States Patent
Shah

(10) Patent No.: US 7,566,008 B1
(45) Date of Patent: *Jul. 28, 2009

(54) GOOD READ INDICATOR FOR HYBRID CODE READER

(75) Inventor: Nainesh P. Shah, Lewisville, TX (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/532,834

(22) Filed: Sep. 18, 2006

Related U.S. Application Data

(63) Continuation of application No. 10/017,655, filed on Dec. 6, 2001, now Pat. No. 7,108,181.

(60) Provisional application No. 60/272,210, filed on Feb. 28, 2001.

(51) Int. Cl.
*G06K 7/10* (2006.01)

(52) U.S. Cl. ............. 235/454; 235/462.25; 235/462.45; 235/472.01

(58) Field of Classification Search .............. 235/454, 235/462.01, 462.25, 462.45, 472.01, 462.07, 235/462.09
See application file for complete search history.

(56) References Cited

U.S. PATENT DOCUMENTS

| | | | |
|---|---|---|---|
| 4,825,057 A | 4/1989 | Swartz et al. | |
| 5,144,114 A | 9/1992 | Wittensoldner et al. | |
| 5,196,686 A | 3/1993 | Leister | |
| 5,444,226 A | 8/1995 | Collins, Jr. | |
| 5,672,858 A | 9/1997 | Li et al. | |
| 5,710,417 A | 1/1998 | Joseph et al. | |
| 6,102,289 A | 8/2000 | Gabrielson | |
| 6,126,075 A * | 10/2000 | Agabra et al. | 235/454 |
| 6,234,395 B1 | 5/2001 | Chadima, Jr. et al. | |
| 6,267,296 B1 | 7/2001 | Ooshima et al. | |
| 6,318,635 B1 * | 11/2001 | Stoner | 235/462.45 |
| 6,321,990 B1 | 11/2001 | Giordano et al. | |
| 6,330,973 B1 | 12/2001 | Bridgelall et al. | |
| 6,332,575 B1 | 12/2001 | Schuessler et al. | |
| 6,340,114 B1 | 1/2002 | Correa et al. | |
| RE37,635 E | 4/2002 | Clark et al. | |
| 6,394,355 B1 | 5/2002 | Schlieffers et al. | |
| 6,431,452 B2 | 8/2002 | Feng | |
| 6,448,979 B1 | 9/2002 | Schena et al. | |
| 6,473,519 B1 | 10/2002 | Pidhirny et al. | |
| 6,475,146 B1 | 11/2002 | Frelburger et al. | |
| 6,669,093 B1 * | 12/2003 | Meyerson et al. | 235/472.01 |
| 6,677,852 B1 | 1/2004 | Landt | |
| 6,708,883 B2 * | 3/2004 | Krichever | 235/462.01 |
| 6,832,725 B2 * | 12/2004 | Gardiner et al. | 235/462.21 |
| 7,108,181 B1 * | 9/2006 | Shah | 235/454 |
| 7,270,274 B2 * | 9/2007 | Hennick et al. | 235/462.43 |
| 2002/0070278 A1 * | 6/2002 | Hung et al. | 235/472.01 |

* cited by examiner

*Primary Examiner*—Steven S Paik
*Assistant Examiner*—April A Taylor

(57) ABSTRACT

The present invention relates to an image collecting module. The image collection module is provided with a first indicator operable to provide an indication of a valid read of a first portion of a hybrid dataform and a second indicator operable to provide an indication of a valid read of a second portion of the hybrid dataform.

20 Claims, 5 Drawing Sheets

GOOD READ INDICATOR FOR HYBRID CODE READER

CROSS REFERENCE TO RELATED APPLICATION

This application is a continuation of U.S. patent application Ser. No. 10/017,655, filed Dec. 6, 2001, entitled GOOD READ INDICATOR FOR HYBRID CODE READER, which claims priority to U.S. patent application Ser. No. 60/272,210, which was filed Feb. 28, 2001, entitled GOOD READ INDICATOR FOR HYBRID CODE READER. This application is related to U.S. patent application Ser. No. 09/182,205, filed Oct. 30, 1998, entitled AUDIBLE INDICATORS FOR OPTICAL CODE READING SYSTEMS. The entireties of these applications are incorporated herein by reference.

FIELD OF THE INVENTION

The present invention relates to image collection and, more particularly, to a portable image collection module having multiple indicators for informing a user of a valid input for different portions of a hybrid dataform.

BACKGROUND OF THE INVENTION

There are numerous types of portable image collection devices. One type of image collection device is a portable data collection device, which is widely used in manufacturing, service and package delivery industries to perform a variety of on-site data collection activities. Such portable data collection devices often include integrated bar code dataform readers adapted to read bar code dataforms affixed to products, product packaging and/or containers in warehouses, retail stores, shipping terminals, for inventory control, tracking, production control and expediting, quality assurance and other purposes.

Bar code dataforms come in a variety of different formats including one and two dimensional bar codes, matrix codes and graphic codes, as well as words and numbers and other symbols, which may be printed or etched on paper, plastic cards and metallic and other items. For example, a one dimensional bar code dataform typically consists of a series of parallel light and dark rectangular areas of varying widths. The light areas are often referred to as Aspaces@ and the dark areas as Abars.@ Different widths of bars and spaces define different characters in a particular bar code dataform.

Data originally encoded in a dataform is recovered for further use in a variety of ways. For example, a printed bar code may be illuminated to derive reflectance values which are digitized, stored in buffer memory and subsequently decoded to recover the data encoded in the bar code. The printed bar code may be illuminated using a laser, an array of LEDs, ambient light, or the like. The light reflected from the printed bar code typically is collected or captured using a photosensor such as, for example, a CCD detector or CMOS detector. A visual (e.g., a tri-color light emitting diode) and/or audible indicator (e.g., a beep from a speaker ) is provided to inform a user whether or not a proper reading has been obtained.

Recently, new hybrid type codes have been developed which include a one-dimensional code bottom portion and a two-dimensional code top portion. However, there is no indicator mechanism to inform a user when either one or both portions of the new hybrid type code has been successfully decoded by a dataform reading device. Therefore, there is an unmet need in the art to provide a system and method for informing a user reading a hybrid barcode when either or both portions of a hybrid dataform has been successfully read.

SUMMARY OF THE INVENTION

The present invention relates to an image collecting module operable to read one-dimensional, two-dimensional and hybrid dataforms. The image collection module includes a selection switch for determining which type of dataform to read. The image collecting module is provided with an indicator system and method for providing a user with indication of a valid read and an invalid read. In the case of a hybrid dataform, the image collecting module is provided with a first indicator for indicating a valid read for a first portion of the hybrid dataform (e.g., the one-dimensional portion or the two-dimensional portion) and a second indicator for indicating a valid read for a second portion (e.g., the other of the one-dimensional portion or the two-dimensional portion). The first and second indicators may be visual, audible, mechanical (e.g., vibration) or a combination of the above. Error indicators are also provided for indicating an invalid read for the first and/or the second portions of the hybrid dataform.

One aspect of the present invention relates to an image collecting module. The image collection module comprises a first indicator operable to provide an indication of a valid read of a first portion of a hybrid dataform and a second indicator operable to provide an indication of a valid read of a second portion of the hybrid dataform. The first and second indicators can be LEDs that flash at a first color (e.g., green) for a valid read and flash at a second color for an invalid read (e.g., red). The first LED can flash after a valid read or an invalid read of the first portion, while the second LED can flash after a valid read or an invalid read of the second portion. Alternatively, the first indicator and the second indicator can be a first and second state of a LED. For example, the LED can illuminate after a valid read of a first portion and turn off after a valid read of a second portion. The LED can flash with an error indication if an invalid read of the first and second portion occurs, or a timeout between reads. It is to be appreciated that many variations may be performed in providing visual indicators for the reading of the first and second portions.

The first and second indicators can be audible signals such as a beep. The first and second indicators can include a first and second audible signal having different tones. Alternatively, the first and second indicators can be a first and a second state of an audible signal. For example, the audible indicator can turn on after a valid read of a first portion of a hybrid dataform and turn off after a valid read of a second portion of the hybrid dataform. An error indicator having a different tone can indicate an invalid read or a timeout between reads. Additionally, the indicator can be mechanical such as a vibration system. The vibration system can turn on when a first portion of a hybrid dataform is validly read and turn off after a valid read of a second portion of the hybrid dataform. The first and second indicators and the error indicators can be one or any of the above mentioned indicator types. For example, a LED can flash after a valid read of a first portion of the hybrid dataform and an audible signal can be provided after a valid read of the second portion. The dataform can vibrate, flash the LED with a different color and/or provide an audible signal of a different tone for an error indication.

To the accomplishment of the foregoing and related ends, the invention, then, comprises the features hereinafter fully described and particularly pointed out in the claims. The following description and the annexed drawings set forth in detail certain illustrative examples of the invention. These examples are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

Figure 1:
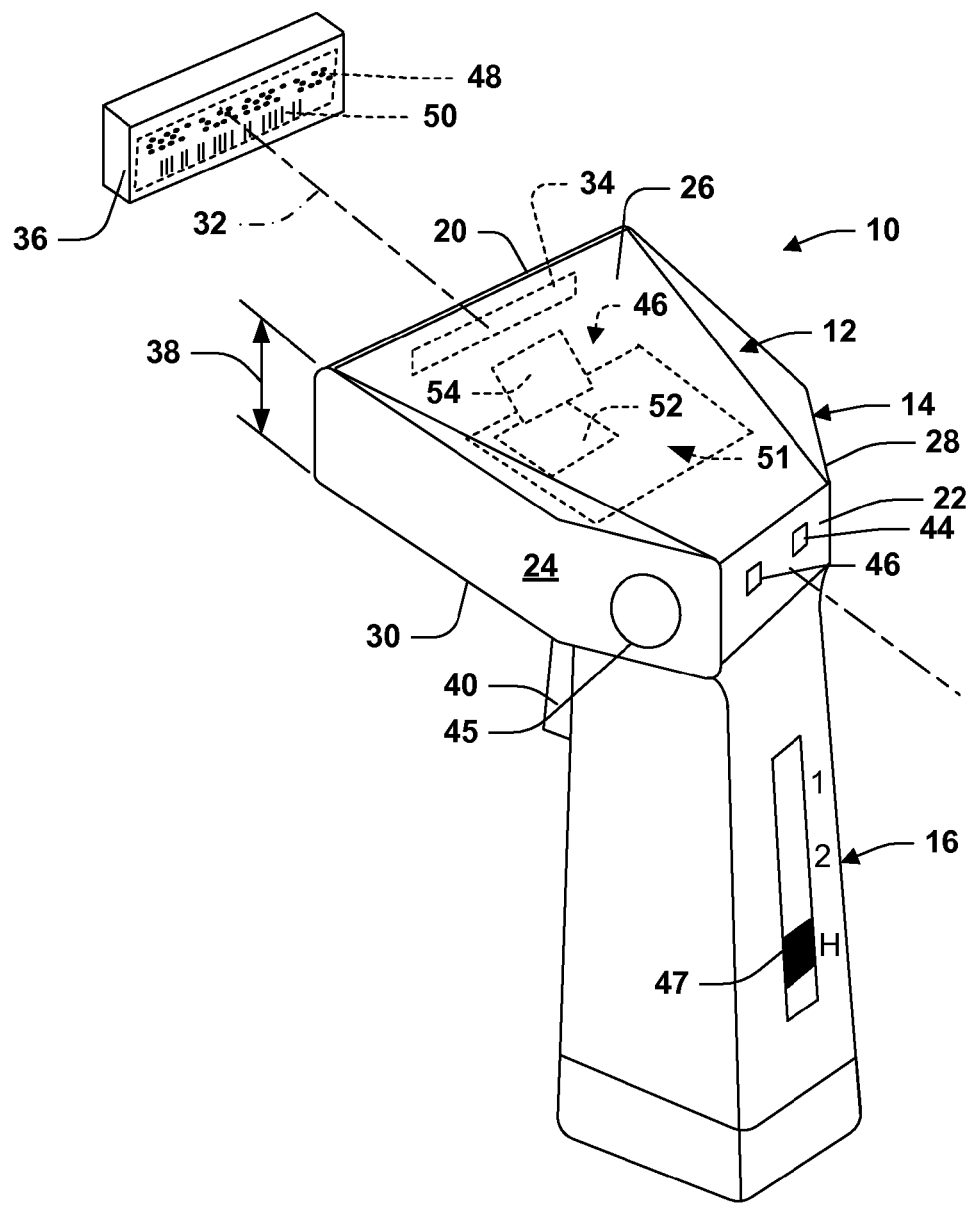
FIG. 1 is an isometric view of a portable image collection module in accordance with one aspect of the present invention.

FIG. 1 illustrates a portable, hand held image collection module (or image reader) 10 in accordance with the present invention. The portable image collection module 10 includes a housing 12 defining an interior region which contains various mechanical and electrical components as described herein. The housing 12 includes upper and lower housing portions 14 and 16, respectively. The upper portion 14 includes end portions 20 and 22 which are spaced apart by elongated sidewall portions 24, 26, 28, 30. A central axis 32 extends through the end portions 20 and 22 substantially parallel to the sidewall portions 24-30. An aperture 34 is formed in the front end portion 20 for receiving reflected light from a target object 36 that is aligned with the axis 32. The upper housing portion 14 has a height, indicated at 38, which is defined by the distance between sidewall portions 26 and 30. While in this example, the upper portion of the housing 14 is a generally rectangular cylinder or cube, it is to be appreciated that other housing shapes and configurations may be employed and that all such configurations are intended to be within the scope of the appended claims.

The lower housing portion 16 extends from the lower sidewall 30 of the upper housing portion 14 near the end 22. The lower housing portion 16 is sized to be grasped in the hand of an operator. A trigger, switch or actuator 40 is coupled to the housing 12 for initiating image collection by the module 10. The trigger 40 is positioned, for example, to be depressed by an index finger of the operator while the lower housing portion 16 of the housing 12 is held in the operator's hand. A power source (not shown), such as a rechargeable battery for supplying operating power to the portable image collection module 10, may also be located in the lower housing portion 16.

The housing 12 also includes a first small opening 44 and a second small opening 46 formed in the end portion 22 of the upper housing portion through which a first and a second indicator light emitting diode (LED) are visible. The indicator LEDs, for example, alternates between three colors. The color green is displayed by the indicator LED when the module 10 is on standby, ready for use. The color orange is displayed with the module 10 has successfully completed an operation such as decoding a portion of a target dataform. The color red is displayed when the module 10 is not ready to perform an operation. The first indicator LED provides an indication whether or not a that a successful read has occurred for a two-dimensional dataform or a portion of a two-dimensional dataform, in the case of a hybrid dataform (e.g., a dataform having both one-dimensional and two dimensional portions). The second indicator LED provides an indication whether or not a successful read has occurred for a one-dimensional dataform or a portion of a one-dimensional dataform.

Alternatively, or in addition to the visual LED indicators, an audible indicator may be provided via a speaker 45. For example, the audible indicator can provide a single beep for reading both parts of a hybrid dataform, provide two different beeps as each portion of a hybrid dataform is read, or provide a sustained beep when one portion is read and maintains the beep until the other potion of the dataform is read of a hybrid dataform. The audible indicator can further provide indication when reading in either a one-dimensional or two-dimensional dataform. A single similar beep can be provided for a successful reading of either a one-dimensional or two-dimensional dataform or different beeps either in sound or repetition can be provided the one-dimensional and two-dimensional dataforms. A switch 47 is located on the lower housing portion 16. The switch provides a user with the ability to select between reading from a one-dimensional, a two-dimensional or a hybrid dataform.

An imaging assembly 46 is mounted in the upper housing portion 14 for imaging the target object 36 having a two-dimensional imaging target area 48 located above a one-dimensional target area 50. The imaging target areas 48 and 50 define the field of view of the imaging assembly 46, with the axis 32 intersecting the imaging target area near its center. The image (e.g., reflected light) of the target object 36 is received by the imaging assembly through the aperture 34. The imaging assembly 46 includes a photosensor circuit board 51 having a photosensor array 52 and other circuitry to facilitate the image collection process. The imaging assembly 46 also includes at least one reflector 54 for receiving the image of the target object 36 and redirecting the received image onto the photosensor array 52. The reflector 54 may direct the both the two-dimensional imaging target area 48 and the one-dimensional target area 50 to different portions of the photosensor array 52. Alternatively, the reflector may be movable to direct one of the portions to the photosensor array prior to directing the other portion. It is to be appreciated that a variety of different methodologies may be employed to direct and decode the image of the target object 36.

Figure 2:
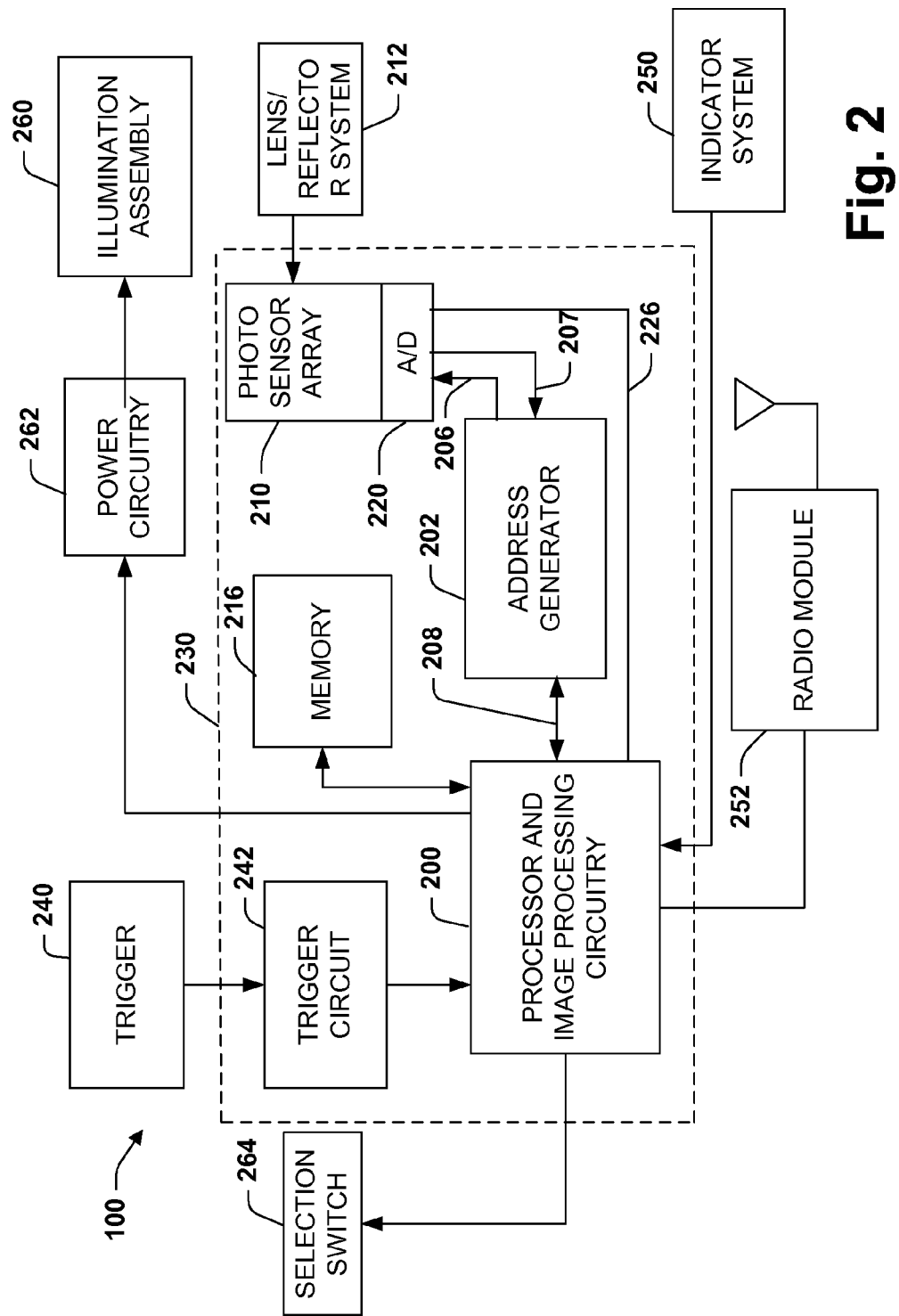
FIG. 2 is a block diagram of the components of a portable image collection module in accordance with one aspect of the present invention.

Turning now to FIG. 2, a block diagram of an image collection module 100 in accordance with the present invention is provided. A microprocessor 200 controls the various operations and performs image analysis in decoding a target dataform as is described more fully below. The microprocessor 200 is programmed to carry out the various control and processing operations for performing the functions disclosed herein. A memory 216 coupled to the microprocessor 200 serves to store the various programs and other data associated with the operation of the image collection module 100. A person having ordinary skill in the art will be able to program such operations without undue effort. Hence, additional detail is omitted for sake of brevity.

The microprocessor 200 is coupled to an address generator 202, via a local bus 208, which is designed to output a sequence of pixel addresses corresponding to a desired pixel data readout pattern from a photosensor array 210. For example, the microprocessor 200 may be configured to read out consecutive horizontal lines of pixel data from multiple zones so that such pixel data can be processed to reconstruct the entire image provided within the field of view of the image collection module 100. The addresses are provided from the address generator 202 to the photosensor array 210 via an address bus 206. The photosensor array 210 provides, as its output data, pixel data on data bus 207 which corresponds to the address provided on bus 206. The address generator 202 in turn provides the pixel data to the microprocessor 200 via bus 208. Data may therefore be collected from the photosensor array 210 substantially in real time according to a predefined data readout pattern. It will be appreciated that, while the present example depicts the address generator 202 to be physically separated from the photosensor array 210, it is possible for both components to be provided on a single chip.

By way of example, to carry out a dataform reading operation, the operator points a lens/reflector system 212 towards the target object to be imaged. Light is directed by the reflector system 212 to an associated lens thereof which cooperate with one another to focus the light on the photosensor array 210. The operator then initiates the image read operation via a trigger 240 or other methods. A trigger circuit 242 generates an interrupt signal which is provided to the microprocessor 200 indicating the initiation of an image reading operation. The microprocessor 200 communicates with the address generator 202 via the control bus 208 which causes the address generator 202 to begin generating addresses for the predefined readout pixel pattern.

The image data from the photosensor array 210 consists of digital data indicative of the instantaneous illumination of the pixel. For example, the target object may be formed of a series of black and white bars/spaces (e.g., a one-dimensional bar code dataform), a series of black and white rows and columns of dots (e.g., a two dimensional bar code dataform or a combination of both (e.g., a hybrid bar code dataform). The photosensor array 210 includes an analog to digital (A/D) converter 220 therein for converting analog pixel data obtained from the addressed pixels to digital pixel data. Alternatively, the A/D converter 220 may be separate from the photosensor array 210. The A/D converter 220 has adjustable gain which may be adjusted via a gain adjust control signal provided on line 226 from the microprocessor 200. The digitized pixel data from the photosensor array 210 is provided via the address generator 202 to the microprocessor 200. The microprocessor 200 evaluates the range of the acquired pixel data on-the-fly to see if the full range of the A/D converter 220 is utilized. If not, the microprocessor 200 adjusts the gain of the input to the A/D converter 220. The microprocessor 200 then receives a distance measurement from a distance measurement device 250 according to the distance that the target object is from the module 100. The microprocessor 200 then transmits an adjustment signal to the reflector system 212, so that the appropriate focal length is provided. The microprocessor 200 then proceeds to decode the image of the target object (e.g., dataform).

The image collection module 100 further includes a radio module 252 and antenna 254 for wirelessly transmitting and receiving data with remote devices. Additionally and/or alternatively, the image collection module 100 may include a serial or parallel I/O port (not shown) for communicating data with external devices.

The microprocessor 200 is coupled to an illumination assembly 260 via power circuitry 262 which enables the microprocessor 200 to control the illumination assembly 260 to provide general illumination and targeting during operation. The illumination assembly 260 of the present example may employ any of various light sources wherein output light is sculpted to be spread across a target object, such as a dataform. The microprocessor 200 also is coupled to a selection switch 264 to allow a selection of a dataform type (e.g., one-dimensional, two-dimensional or hybrid dataform. The microprocessor controls and operates an indicator system 250. The indicator system 250 provides indication to a user whether or not a valid read has occurred. The indicator system 250 is operable to provide indication of a valid read of a one-dimensional, two-dimensional or hybrid dataform based on the selection of selection switch 264.

While in this example, the trigger circuit 242, processor 200, memory 216, address generator 202 and photosensor array 210 are illustrated as being part of the circuit board 230, it is to be appreciated that, in addition to the photosensor array, a greater or lesser amount of circuit components may be included as part of the circuit board 230 in accordance with the present invention.

Figure 3:
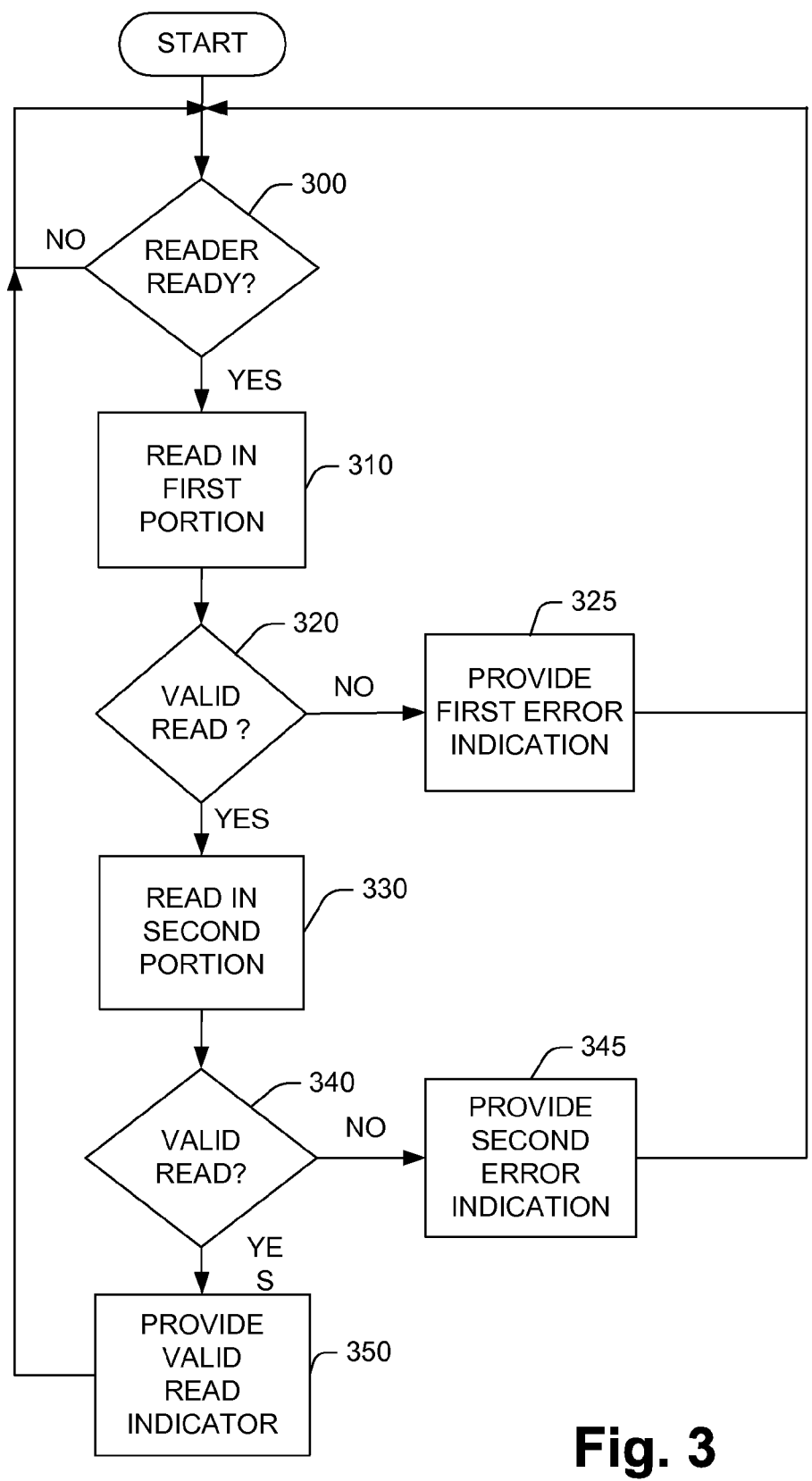
FIG. 3 illustrates a methodology for providing indication of a valid read of a first and second portion of a hybrid dataform.

FIG. 3 is a flow diagram illustrating an example of a methodology that the processor and image processing circuitry may run for providing indication of a valid or invalid read for a hybrid dataform. The methodology or routine is performed after the image collection module 100 has a hybrid dataform captured within the field of view and after the trigger 240 is depressed. At 300, the processor and image processing circuitry 200 determines if the image collection module is ready. If the image collection module is not ready (NO), the methodology will continue determining whether or not the image collection module is ready at 300. If the image collection module is ready (YES), the methodology proceeds to 310 and reads and decodes a first portion of the hybrid dataform. The routine then determines if a valid read of the first portion has occurred at 320. If a valid read has not occurred (NO), the routine proceeds to 325 to provide a first error indication and then returns to 300. If a valid read has occurred (YES), the routine advances to 330 to read and decode a second portion of the hybrid dataform. The methodology then determines if a valid read of the second portion has occurred at 340. If a valid read has not occurred (NO), the routine proceeds to 345 to provide a second error indication and then return to 300. If a valid read has occurred (YES), the routine advances to 350 to activate a valid read indicator. The routine then returns to 400 for the next read.

Figure 4:
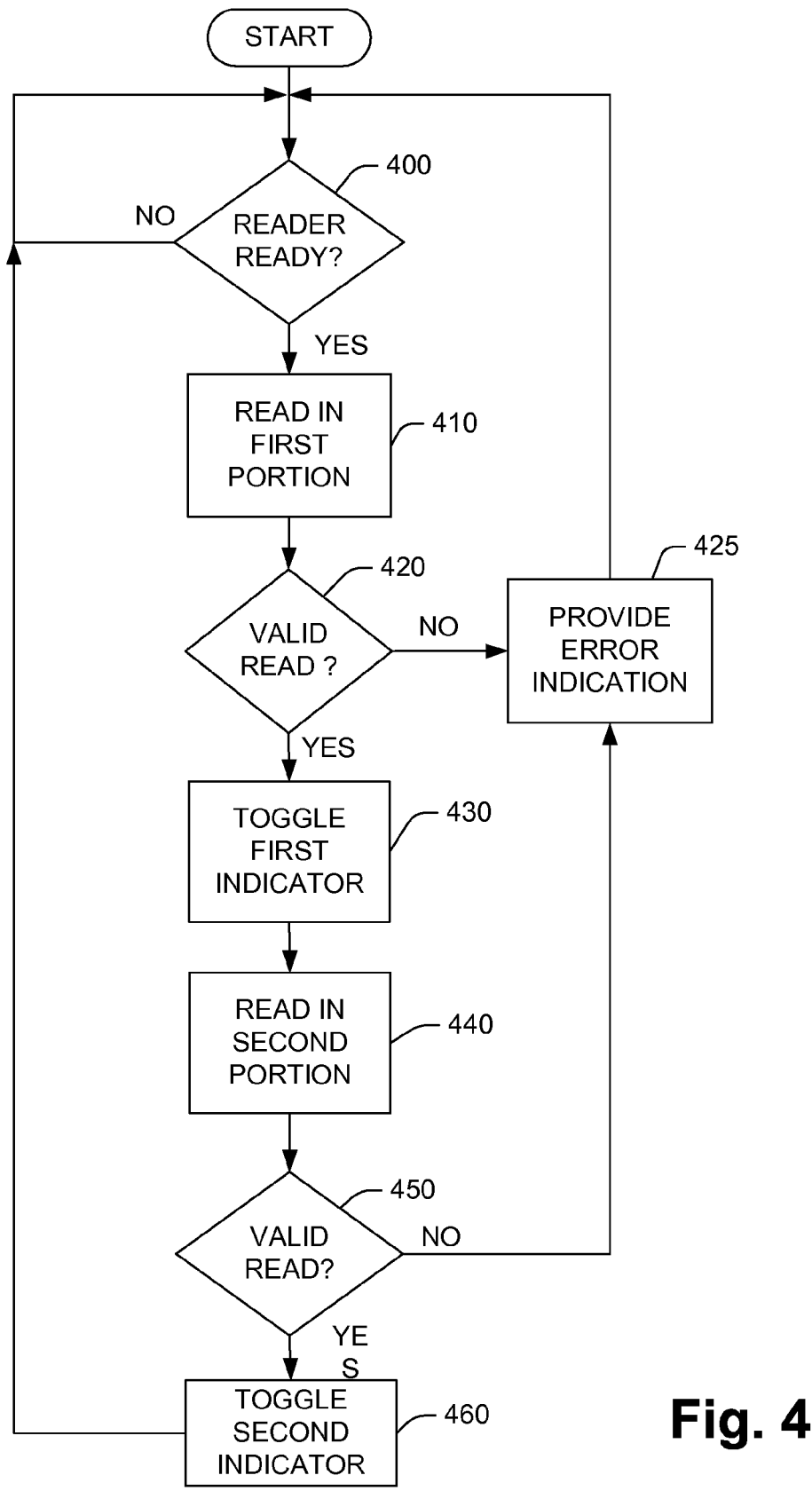
FIG. 4 illustrates another methodology for providing indication of a valid read of a first and second portion of a hybrid dataform.

FIG. 4 is a flow diagram illustrating another example of a methodology that the processor and image processing circuitry can run for providing indication of a valid or invalid read for a hybrid dataform. The methodology or routine is performed after the image collection module 100 has a hybrid dataform captured within the field of view and after the trigger 240 is depressed. At 400, the processor and image processing circuitry 200 determines if the image collection module is ready. If the image collection module is not ready (NO), the methodology will continue determining whether or not the image collection module is ready at 400. If the image collection module is ready (YES), the methodology proceeds to 410 and reads and decodes a first portion of the hybrid dataform. The routine then determines if a valid read of the first portion has occurred at 420. If a valid read has not occurred (NO), the routine proceeds to 425 to provide an error indication and then returns to 400. If a valid read has occurred (YES), the routine advances to 430 to toggle a first indicator. The routine then proceeds to 440 to read and decode a second portion of the hybrid dataform. The methodology then determines if a valid read of the second portion has occurred at 450. If a valid read has not occurred (NO), the routine proceeds to 425 to provide an error indication and then returns to 400. If a valid read has occurred (YES), the routine advances to 460 to toggle a second indicator. The routine then returns to 400 for the next read.

Figure 5:
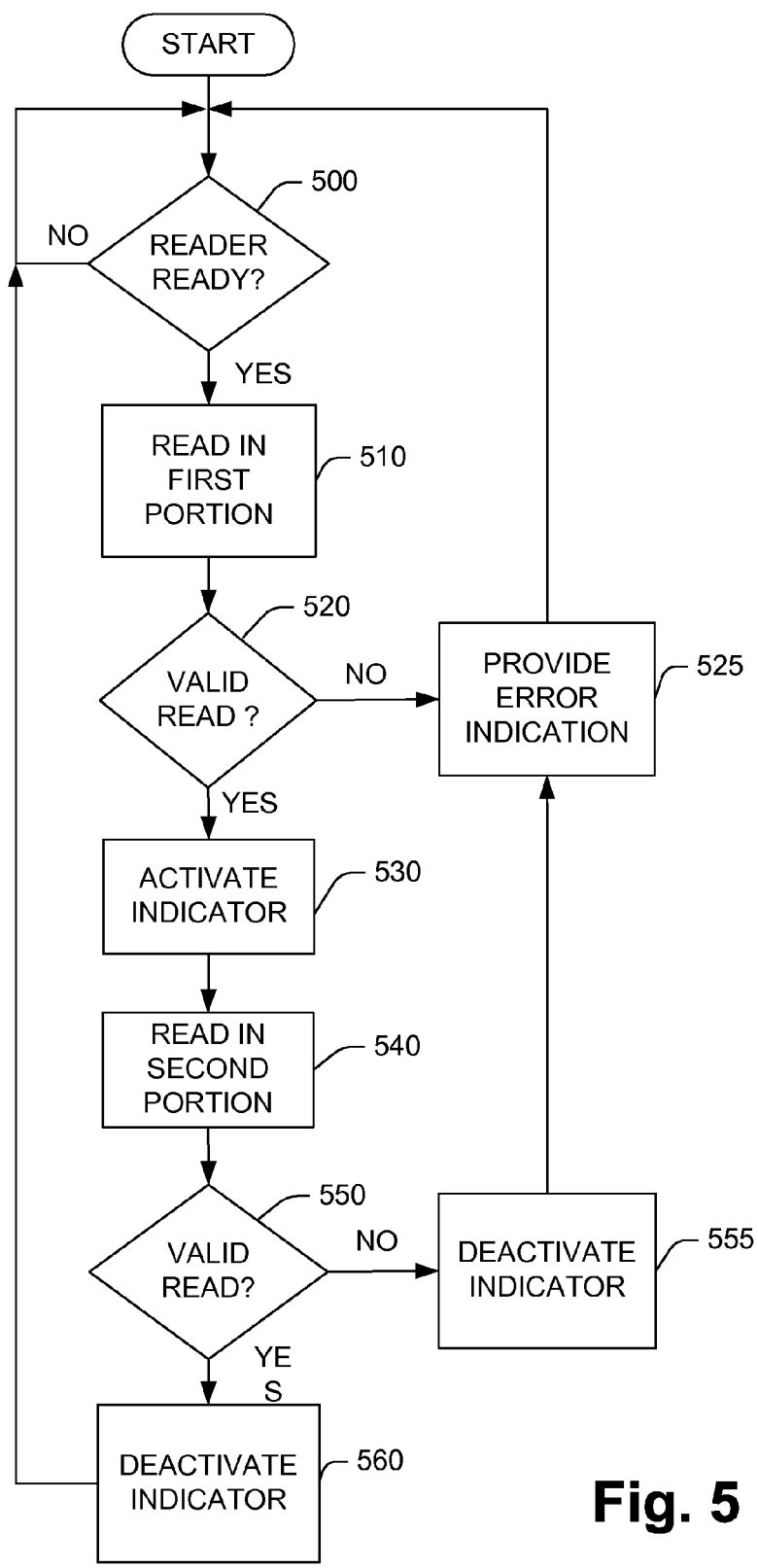
FIG. 5 illustrates yet another methodology for providing indication of a valid read of a first and second portion of a hybrid dataform.

FIG. 5 is a flow diagram illustrating yet another example of a methodology that the processor and image processing circuitry can run for providing indication of a valid or invalid read for a hybrid dataform. The methodology or routine is performed after the image collection module 100 has a hybrid dataform captured within the field of view and after the trigger 240 is depressed. At 500, the processor and image processing circuitry 200 determines if the image collection module is ready. If the image collection module is not ready (NO), the methodology will continue determining whether or not the image collection module is ready at 500. If the image collection module is ready (YES), the methodology proceeds to 510 and reads and decodes a first portion of the hybrid dataform. The routine then determines if a valid read of the first portion has occurred at 520. If a valid read has not occurred (NO), the routine proceeds to 525 to provide an error indication and then returns to 500. If a valid read has occurred (YES), the routine advances to 530 and activates an indicator. The routine then proceeds to 540 to read and decode a second portion of the hybrid dataform. The methodology then determines if a valid read of the second portion has occurred at 550. If a valid read has not occurred (NO), the routine proceeds to 555 to deactive the indicator and then returns to 525 to provide an error indication. If a valid read has occurred (YES), the routine advances to 560 to deactivate the indicator. The routine then returns to 500 for the next read.

What has been described above are certain aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims. Furthermore, to the extent that the term includes is used in either the detailed description and the claims, such term is intended to be inclusive in a manner similar to the term comprising.

What is claimed is:

1. An image collection module comprising:
   an optical system that directs a first target area image and a second target area image onto a photosensor array; and
   a first indicator and a second indicator that respectively indicate whether a valid detection is made of the first target area image and the second target area image.

2. The image collection module of claim 1, the optical system comprises a reflector that directs the respective first and second target area images to different portions of the photosensor array.

3. The image collection module of claim 1, the optical system comprises a reflector that moves to direct one of the first and second target area images to the photosensor array prior to directing the respective other of the first and second target area images to the photosensor array.

4. The image collection module of claim 1, one of the first and second target areas is a one-dimensional portion of a hybrid dataform, and the respective other of the first and second target areas is a two-dimensional portion of a hybrid dataform.

5. The image collection module of claim 1, at least one of the first and second indicators comprises a photo indicator.

6. The image collection module of claim 5, the first indicator comprises a first LED and the second indicator comprises a second LED.

7. The image collection module of claim 6, the first LED comprises at least a first color and the second LED comprises at least a second color.

8. The image collection module of claim 6, the first LED is configured to emit a first valid signal that indicates a valid detection of the first target area image and a first invalid signal that indicates an invalid detection of the first target area image, and the second LED is configured to emit a second valid signal that indicates a valid detection of the second target area image and a second invalid signal that indicates an invalid detection of the second target area image.

9. The image collection module of claim 8, the respective signals are selected from at least one of different color signals, pulsation signals and on/off state signals.

10. The image collection module of claim 5, at least one of the first and second indicators comprises a visual indicator and at least the respective other of the first and second indicators comprises an audible indicator.

11. The image collection module of claim 1, further comprising an illumination assembly that spreads an output light onto the first and second target areas such that reflected light is detected by the photosensor array.

12. The image collection module of claim 1, the optical system further comprises a lens system that focuses the first and second target area images onto the photosensor array.

13. A method of reading a hybrid dataform comprising:
    detecting a first target area image and a second target area image directed to a photosensor array; and
    indicating whether a valid read is made of each of the first target area image and the second target area image by employing a first indicator for the first target area image and a second indicator for the second target area image.

14. The method of claim 13, the directing comprises directing the respective first target area image and the second target area image to different portions of the photosensor array.

15. The method of claim 13, the directing comprises directing one of the first and second target area images to the photosensor array prior to directing the respective other of the first and second target area images.

16. The method of claim 13, the indicating comprises illuminating at least one photo indicator.

17. The method of claim 16, the indicating comprises illuminating the first photo indicator to indicate detection of the first target area image, and illuminating the second photo indicator to indicate detection of a second target area image.

18. The method of claim 16, the illuminating the first photo indicator comprises emitting a first valid signal to indicate a valid detection of the first target area image and a first invalid signal to indicate an invalid detection of the first target area image, and the illuminating the second photo indicator comprises emitting a second valid signal to indicate a valid detection of the second target area image and a second invalid signal to indicate an invalid detection of the second target area image.

19. The method of claim 18, the illuminating the first and second photo indicators comprises emitting respective signals selected from at least one of different color signals, pulsation signals and on/off state signals.

20. An image collection module comprising:
    means for detecting a first target area image and a second target area image; and
    means for indicating whether a valid read is made of each of the images of the first target area and the second target area by employing a first indicator for the first target area image and a second indicator for the second target area image.

* * * * *